US010585621B2

(12) United States Patent
Huang et al.

(10) Patent No.: US 10,585,621 B2
(45) Date of Patent: Mar. 10, 2020

(54) STATICALLY-SCHEDULABLE FEED AND DRAIN STRUCTURE FOR SYSTOLIC ARRAY ARCHITECTURE

(71) Applicant: Intel Corporation, Santa Clara, CA (US)

(72) Inventors: Randy Huang, San Jose, CA (US); Yeong Tat Liew, Penang (MY); Jason Gee Hock Ong, Penang (MY)

(73) Assignee: Intel Corporation, Santa Clara, CA (US)

( * ) Notice: Subject to any disclaimer, the term of this patent is extended or adjusted under 35 U.S.C. 154(b) by 102 days.

(21) Appl. No.: 15/719,922

(22) Filed: Sep. 29, 2017

(65) Prior Publication Data

US 2018/0307438 A1 Oct. 25, 2018

Related U.S. Application Data

(60) Provisional application No. 62/488,635, filed on Apr. 21, 2017.

(51) Int. Cl.
*G06F 17/30* (2006.01)
*G06F 3/06* (2006.01)
(Continued)

(52) U.S. Cl.
CPC .......... *G06F 3/0656* (2013.01); *G06F 3/0604* (2013.01); *G06F 3/0673* (2013.01);
(Continued)

(58) Field of Classification Search
CPC . H04L 47/30; G06T 1/20; G06F 17/12; G06F 13/4022
See application file for complete search history.

(56) References Cited

U.S. PATENT DOCUMENTS

| 7,865,255 | B2 * | 1/2011 | Hsieh | H04L 29/06027 700/94 |
| 8,510,364 | B1 * | 8/2013 | Rao | G06F 17/12 708/201 |
| 2014/0289445 | A1 * | 9/2014 | Savich | G06F 13/4022 710/317 |
| 2015/0180787 | A1 * | 6/2015 | Hazelet | H04L 47/30 370/235 |
| 2016/0267111 | A1 * | 9/2016 | Shoaib | G06T 1/20 |

FOREIGN PATENT DOCUMENTS

EP 0422348 A2 4/1991

OTHER PUBLICATIONS

Partial European Search Report for EP Application No. 18163741.4 dated Nov. 19, 2018; 16 Pages.
(Continued)

*Primary Examiner* — Ryan Bertram
*Assistant Examiner* — Trang K Ta
(74) *Attorney, Agent, or Firm* — Fletcher Yoder, P.C.

(57) ABSTRACT

A systolic array implemented in circuitry of an integrated circuit includes a processing element array including processing elements. The systolic array includes one or more feeder circuits communicatively coupled to the processing element array. Each of the one or more feeder circuits includes a first section configured to receive data stored in memory external to the integrated circuit, and a second section configured to send the received data to the processing element array, wherein data transferring from the memory to the processing element array is double buffered by the first section and the second section. The systolic array also includes one or more drain circuits communicatively coupled to the processing element array, including one or more memory buffers configured to store data output by the processing element array.

20 Claims, 9 Drawing Sheets

(51) Int. Cl.
   *G06F 17/16*   (2006.01)
   *G06F 7/523*   (2006.01)
   *G06F 5/08*    (2006.01)
   *G06F 5/06*    (2006.01)
   *G06F 15/80*   (2006.01)
   *G06F 5/14*    (2006.01)
   *G06F 15/76*   (2006.01)
   *G06N 3/063*   (2006.01)

(52) U.S. Cl.
   CPC ............... *G06F 5/065* (2013.01); *G06F 5/08* (2013.01); *G06F 5/14* (2013.01); *G06F 7/523* (2013.01); *G06F 15/76* (2013.01); *G06F 15/8046* (2013.01); *G06F 17/16* (2013.01); *G06F 2205/067* (2013.01); *G06F 2205/126* (2013.01); *G06N 3/063* (2013.01)

(56) References Cited

OTHER PUBLICATIONS

Jialiang Zhang et al: "Improving the Performance of OpenCL-based FPGA Accelerator for Convolutional Neural Network", Proceedings of the 2017 ACM/SIGDA International Symposium on Field-Programmable Gate Arrays, Feb. 22, 2017 (Feb. 22, 2017) pp. 25-34, New York, New York, USA.

Moss et al: "High performance binary neural networks on the Xeon+FPGA(TM) platform", 2017 27th International Conference on Field Programmable Logic and Applications (FPL), Ghent University, Sep. 4, 2017 (Sep. 4, 2017), pp. 1-4.

\* cited by examiner

STATICALLY-SCHEDULABLE FEED AND DRAIN STRUCTURE FOR SYSTOLIC ARRAY ARCHITECTURE

CROSS REFERENCE TO RELATED APPLICATION

This application claims priority to and benefit of U.S. Provisional Patent Application No. 62/488,635, entitled "Statically schedulable Feed and Drain Structure for Systolic Array Architecture," filed Apr. 21, 2017, which is herein incorporated by reference in its entirety.

BACKGROUND

The present disclosure relates generally to matrix multiply operations. More particularly, the present disclosure relates to methods and apparatuses to implement systolic array matrix multiplier for matrix multiply operations.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many numerical computing applications, such as high-performance computing, deep learning (e.g., study of artificial neural networks and related machine learning algorithms), and digital signal processing (DSP), rely on matrix multiplication computations. There has been great success using systolic arrays in hardware and software to perform matrix multiplication computations. However, there may be challenges implementing systolic array architecture on a field-programmable gate array (FPGA) platform. For example, there may be challenges relating to limitations in external memory (e.g., memory external to an integrated circuit, off-chip-memory) bandwidth and limitations in FPGA on-chip memory. In particular, off-chip memory bandwidth may be insufficient to sustain peak operating performance of the systolic array, while on-chip memory bandwidth may be higher but still limited.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

Figure 1A:
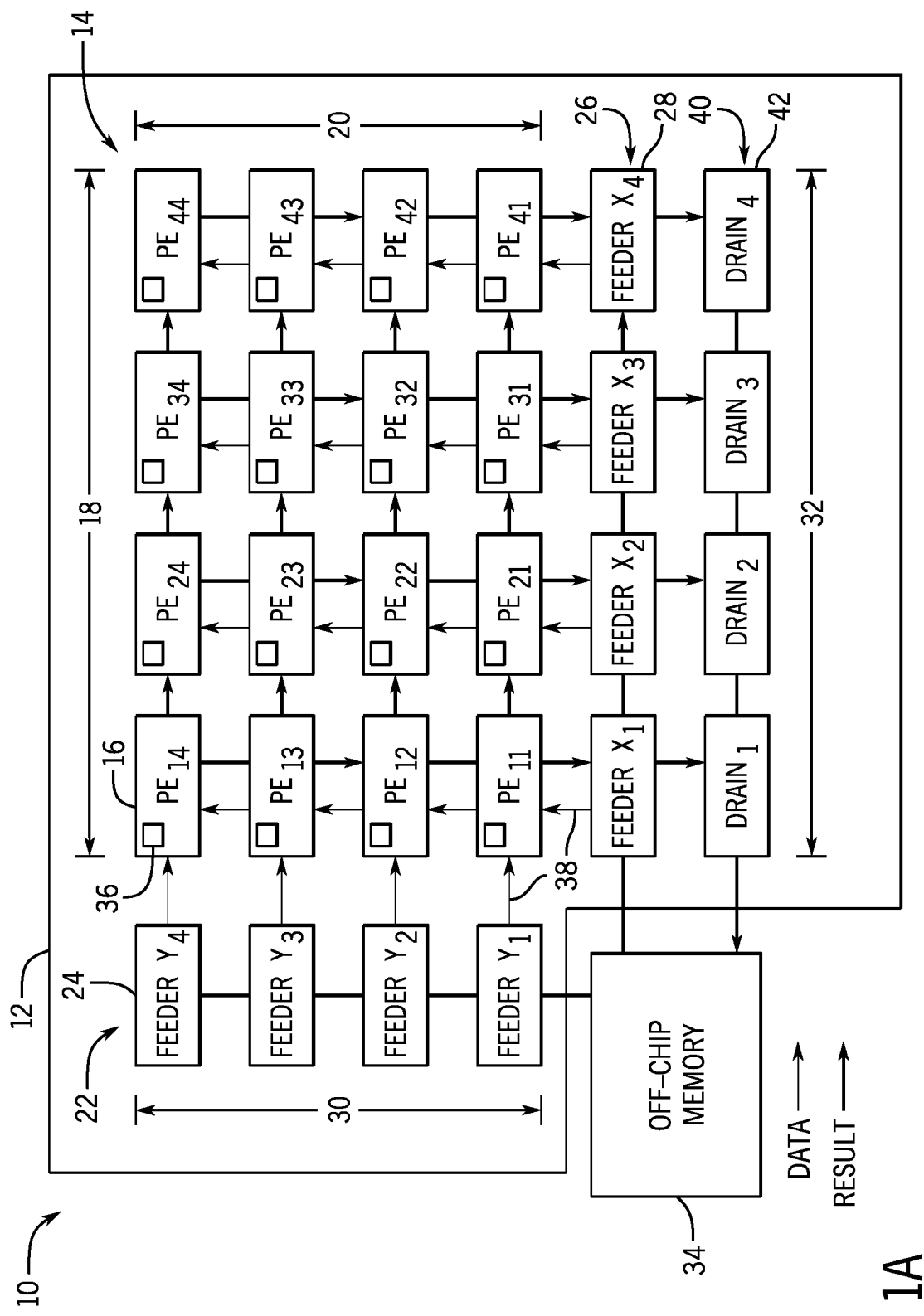
FIG. 1A is a block diagram illustrating an example architecture of a systolic array, in accordance with an embodiment.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. The techniques presented and claimed herein are referenced and applied to material objects and concrete examples of a practical nature that demonstrably improve the present technical field and, as such, are not abstract, intangible or purely theoretical.

Present embodiments relate to matrix multiplication where each row of matrix A may be multiplied with each column of matrix B. Data flow may be pre-determined. Matrix A and B may be arranged in manner where matrix A is used as is and matrix B is transposed. This may reduce complex data sequencing and a size of a memory buffer for reordering. Matrix data may be double-buffered at a feeder circuit. Individual backpressure signals and buffers within the systolic array for intermediate data may be removed. Double buffering may enable simultaneous data fetching from off-chip memory and data streaming into a systolic array. Double buffering may also hide off-chip memory latency. This disclosure encourages high data reuse because each value of the matrix can be shared within the systolic array processing elements (PE).

The feeder circuit has two sections as its memory buffer (double buffering). One section is for loading from off-chip while one section is for streaming into the PE. Data is filled into each sections sequentially; thus, there is no sequencer or reordering. All feeder circuits may share the same feeder controller, thus enabling centralized feed control and reducing control logic. The completion of data loading from each section may be checked/verified (e.g., a valid check). Each section may have its valid based on the section done. Backpressure may be provided from a drain circuit when a drain first in first out (FIFO) memory buffer is full. A repetition block may be used as a data-reuse counter.

Regarding the drain circuit, a systolic array result may be received in statically scheduled fashion since PE generation results in fixed cycle latency. The feeder sections may be pre-buffered and enable high data reuse to ensure a constant stream of generated results. Stalling may be directly driven by write bandwidth (e.g., write waitrequest) that affects the FIFO memory buffer level. All drain circuits may share the same controller, enabling centralized drain control and reducing control logic. A FIFO full signal may be generated by monitoring the FIFO memory buffer level. Efficiency of the drain circuit may be directly proportional to the write bandwidth.

The present embodiments may be designed for efficient matrix multiplications and any suitable applications that use matrix structure, such as neural networks. Double buffering at a feeder circuit enables statically scheduled PEs. Data and controls may be fully feed-forward within the systolic array. Efficiency may be directly driven by write bandwidth. Using such a pre-pattern in-matrix data structure may reduce or eliminate a complex data sequencer. As a result, high performance and high frequency circuits may be realized that have reduced control logic, while most of the time may be spent on data pipelining.

With the foregoing in mind, present embodiments relating to matrix multiplication systolic array feed methods and associated processing microarchitectures for efficiently implementing systolic arrays. These may be implemented on an integrated circuit (e.g., field-programmable gate array (FPGA) or application-specific integrated circuit (ASIC) hardware). Efficient circuits with static scheduling are used for feeding data and draining data, enabling high performance and/or fully feed-forward data flow with no individual backpressure control signals and complex reordering circuits. In particular, data (e.g., matrix $A_{m,n}$ with row and column indices, m and n, and matrix $B_{k,l}$ with row and column indices, k and l) fed from the off-chip memory to the matrix multiplication systolic array may be pre-arranged such that data flow is pre-determined to eliminate other complex data sequencing and large memory buffering for reordering. Data may be double-buffered at feeders, such that individual backpressure signals and buffers within the systolic array for intermediate data are removed, enabling simultaneous data fetching from the off-chip memory and data streaming into the systolic array (e.g., reduced off-chip memory latency). In addition, data may be shared within processing elements (PEs) of the systolic array to facilitate high data reuse (e.g., data interleaving). As the result, the statically scheduled feed and drain circuits for systolic array architecture discussed herein may improve off-chip memory bandwidth, while these circuits are also scalable to implement systolic arrays of larger sizes.

FIG. 1A shows a block diagram illustrating an example architecture of a systolic array 10 implemented on an integrated circuit 12. The integrated circuit 12 may represent, for example, a programmable logic device such as a field-programmable gate array (FPGA) or an application-specific integrated circuit (ASIC) that includes circuitry designed and/or programmed in the manner of this disclosure. The systolic array 10 includes a two-dimensional (2D) processing elements (PE) array 14 including a number of PEs 16 that span a width 18 and a height 20. In the illustrated embodiment, the width 18 and the height 20 of the PE array 14 are four and four, respectively (e.g., a 4 row×4 column array of PEs 16). The PE array 14 is coupled to a feeder array 22 and a feeder array 26 along orthogonal edges of the PE array 14. The feeder array 22 may include a number of feeders 24 (e.g., a first feeder "feeder $Y_1$," a second feeder "feeder $Y_2$," and so forth) and the feeder array 26 may include a number of feeders 28 (e.g., a first feeder "feeder $X_1$," a second feeder "feeder $X_2$," and so forth). The feeder array 22 has a height 30 and the feeder array 24 has a width 32. In the illustrated embodiment, the height 30 of the feeder array 22 equals to the height 20 of the PE array 14 (e.g., four feeders 24) and the width 32 of the feeder array 26 equals to the width 18 of the PE array 14 (e.g., four feeders 28). The feeder arrays 22 and 26 are coupled to an external or off-chip memory 34, such as an external random-access memory (RAM). Although the memory 34 is described as "external" to the integrated circuit 12, additionally or alternatively, it may be on-chip or "internal" to the integrated circuit 12.

In operation, matrix data are loaded from the external memory 34 to the feeder arrays 22 and 26 that buffer the input matrix data and pass the input matrix data into the PE array 14 where the matrix multiplication occurs. As discussed later in FIG. 2, such data buffering in the feeder arrays 22 and 26 may enable simultaneous data fetching from the external memory 34 and data streaming into the systolic array 10. Similarly, each of the PEs 16 in the PE array 14 has a memory 36 to serve as a "bank" to temporarily store the calculated result. Within the PE array 14, the data transfer is propagated in a linear fashion to the subsequent PEs 16 as illustrated by arrows 38 between the PEs 16, passing through the PE array 14 along rows or columns. Each of the PEs 16 is responsible for processing its input and passing the processed data or result to a corresponding drain or sink. In the illustrated embodiment, the systolic array 10 includes a drain or sink array 40 having a number of drains or sinks 42 communicatively coupled to the PE array 14. The drain or sink array 40 may be disposed along one of the PE array 14 axes (e.g., the edge or axes along the feeder array 22 or along the feeder array 26). The width of the drain array 40 equals to the width 32 of the feeder array 26 (e.g., four drains 42). Each of the number of drains 42 processes and/or passes partial results from each column of the PE array 14 to a suitable location (e.g., a system host). More discussions on the drain array 40 are provided in FIG. 3.

Figure 1B:
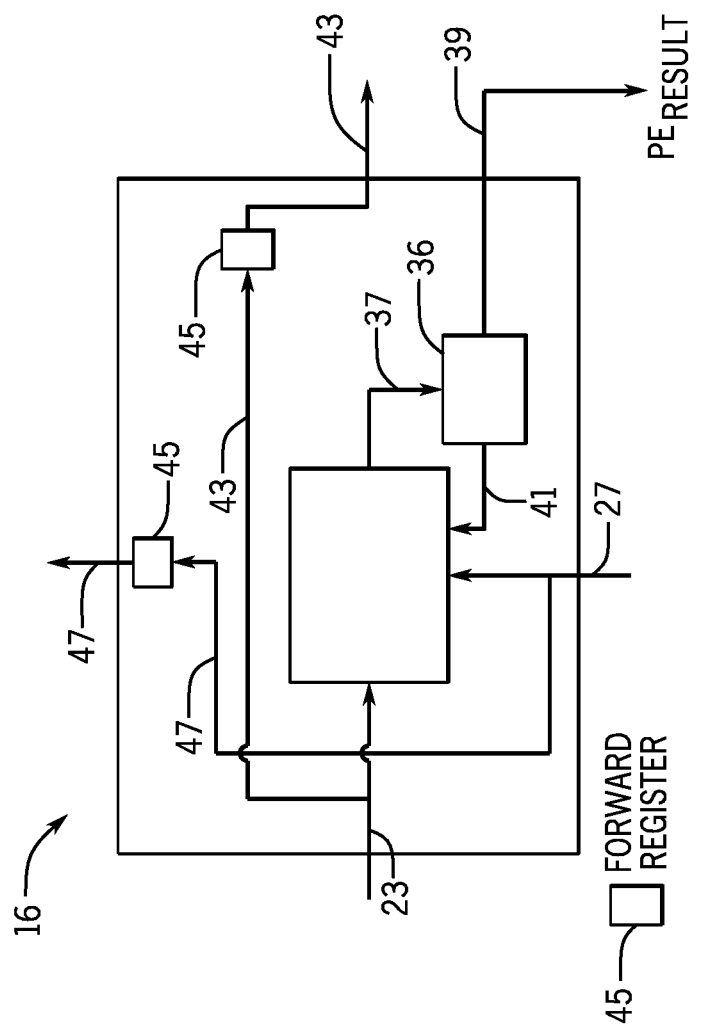
FIG. 1B is a schematic representation of data feeding in and out from processing elements of the systolic array of FIG. 1A, in accordance with an embodiment.

FIG. 1B is a schematic representation of data feeding in and out from the PEs 16 of the systolic array 10 of FIG. 1A, in accordance with an embodiment. In the illustrated embodiment, data (e.g., a portion of data from a first matrix) may be fed from the feeder array 22 into the PE 16 as indicated by a data path 23, and data (e.g., data from a second matrix) may be fed from the feeder array 26 into the PE 16 as indicated by a data path 27. The processed/calculated data or result may be fed to and stored in the memory 36 of the PE 16, as indicated by a data path 37. The processed/calculated data or result may be fed from the memory 36 to the drain array 40, for example to a corresponding drain or sink, as indicated by a data path 39. In one embodiment, the processed/calculated data or result may also be fed back from the memory 36 to the PE 16, as indicated by a data path 41.

Similarly, data (e.g., a portion of data from the first matrix) may be fed from the feeder array 22 into another PE 16 (e.g., the PE in the adjacent row in the PE array 14), as indicated by a data path 43. In one embodiment, a forward register 45 may be disposed along the data path 43 for forward transferring the data. Data (e.g., a portion of data from the second matrix) may be fed from the feeder array 26 into another PE (e.g., the PE in the adjacent column in the PE array 14), as indicated by a data path 47. A forward register (e.g., the forward register 45) may also be disposed along the data path 47 for forward transferring the data.

Figure 2:
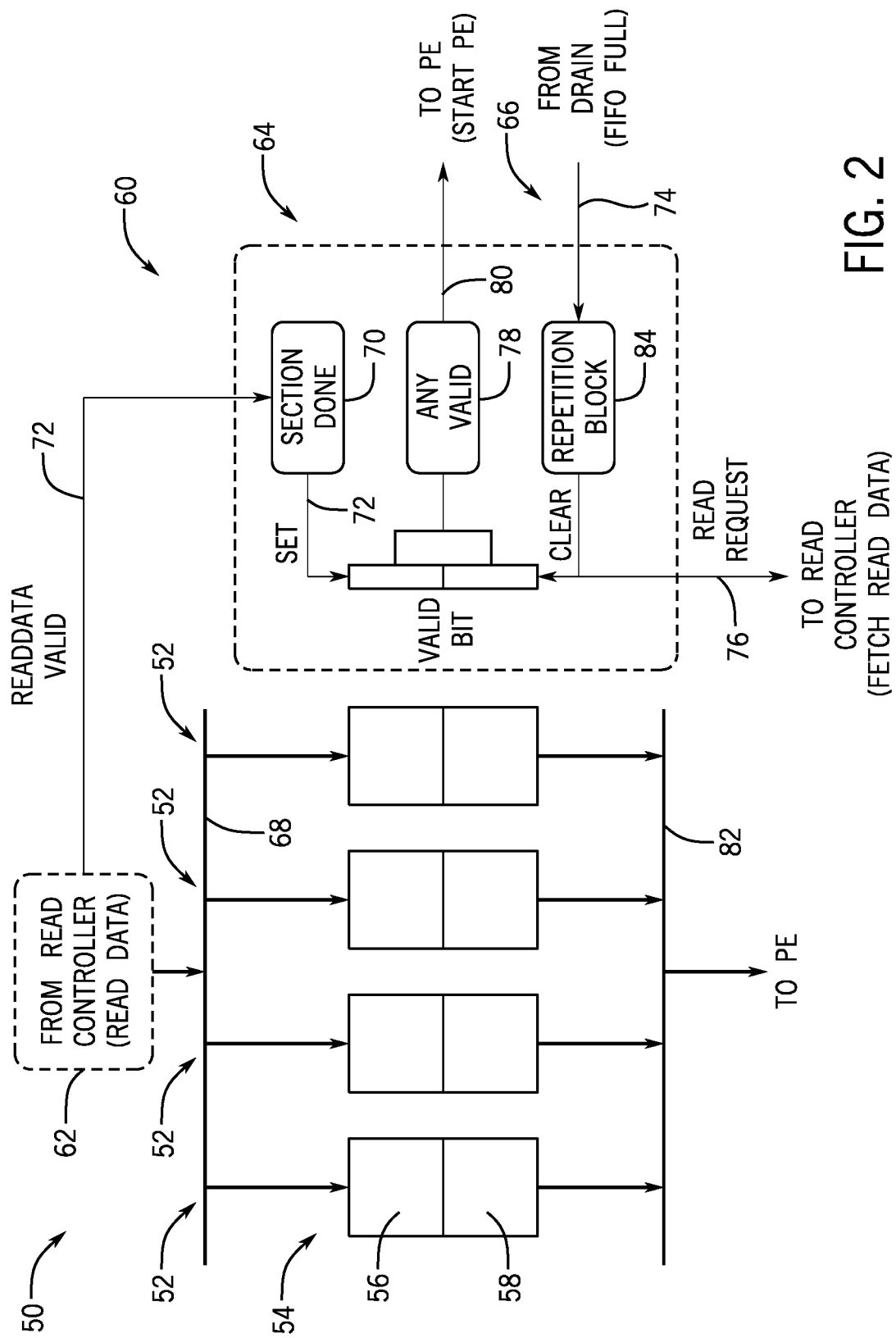
FIG. 2 is a schematic representation of a feeder array microarchitecture of the systolic array of FIG. 1A, in accordance with an embodiment.

FIG. 2 shows an example of a feeder microarchitecture 50 for a feeder array (e.g., the feeder array 22 or the feeder array 26). The feeder microarchitecture 50 may include a feeder circuit 52 for each feeder. In the illustrated embodiment, there are four feeders in each feeder array (e.g., four feeders 24 of the feeder array 22 and four feeders 28 of the feeder array 26 in FIG. 1A); correspondingly, the feeder microarchitecture 50 includes four feeder circuits 52. Each of the feeder circuit 52 includes a memory buffer 54 that includes two sections (e.g., double buffering), a first section 56 and a second section 58. The first section 56 loads matrix data from the off-chip memory 34 to the corresponding feeder while the second section 58 streams the loaded matrix data into the PE array 14. The matrix data is loaded into each of the first and second sections 56 and 58 sequentially. As such, in some embodiments, the feeder microarchitecture 50 may not include a sequencer or a reordering engine. The feeder microarchitecture 50 may also include a feeder controller 60 operatively coupled to the feeder circuits 52. In the illustrated embodiment, all of the four feeder circuits 52 are coupled to the same feeder controller 60, thus enabling centralized feed control and reducing the amount of control logic. In other embodiments, less than all feeder circuits 52 may be coupled to a feeder controller, and the rest of the feeder circuits 52 may be coupled to different feeder controller(s).

The feeder controller 60 may include a read controller 62, a valid-check engine 64, and a backpressure-check engine 66. The read controller 62 may enable reading the matrix data (e.g., matrix $A_{m,n}$ and matrix $B_{k,l}$, as indicated by data communication arrows 68) via the feeder circuits 52. The valid check engine 64 may valid-check each of the first section 56 and the second section 58. For example, the completion of data loading from each of the first section 56 and the second section 58 may be checked/verified (e.g., a valid check). In particular, the valid-check engine 64 may include a block or logic 70 that checks if data loading in the first section 56 and/or the second section 58 is complete, as indicated by data communication arrows 72. The backpressure-check engine 66 may provide information relating to backpressure from the drain array 40. For example, information indicative of backpressure (e.g., write wait request) may be provided, as indicated by a data communication arrow 74, from a drain circuit when a first-in-first-out (FIFO) memory buffer of a drain (e.g., drain 42) is full. When the backpressure check (e.g., data communication arrow 74) is clear (e.g., FIFO memory buffer is not full), the valid-check engine 64 may send a read request, as indicated by data communication arrows 76, to fetch the read matrix data to be fed into the PE array 14. The valid-check engine 64 may include a block or logic 78 that determines a valid signal 80 that initiates loading the read matrix data (e.g., matrix $A_{m,n}$ and matrix $B_{k,l}$) into the PE array 14, via the feeder circuits 52, as indicated by data communication arrows 82. For example, the valid signal 80 is determined upon receipt (e.g. at the block 78) of passing both of the valid check and the backpressure check. In some embodiments, the backpressure-check engine 66 may include a repetition block or logic 84 used as a data-reuse counter. Examples of data reuse (e.g., data interleaving) will be discussed later.

Figure 3:
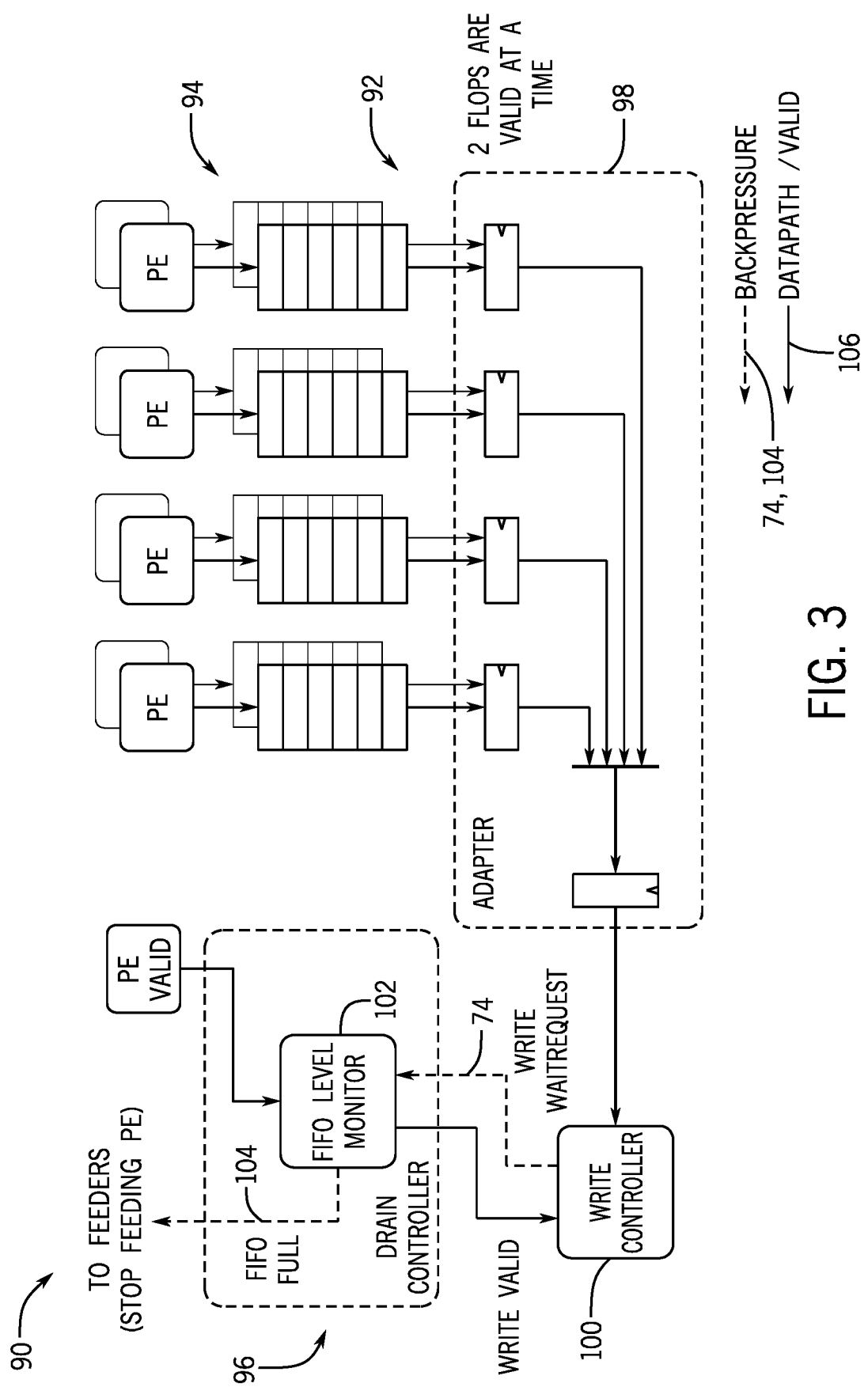
FIG. 3 is a schematic representation of a drain microarchitecture of the systolic array of FIG. 1A, in accordance with an embodiment.

FIG. 3 shows an example of a drain microarchitecture 90 for a drain array (e.g., the drain array 40). The drain microarchitecture 90 may include a drain circuit 92 for each drain. In the illustrated embodiment, there are four drains in each drain array (e.g., the drains 42 of the drain array 40 in FIG. 1A); correspondingly, the drain microarchitecture 90 includes four drain circuits 92. Each of the drain circuit 92 includes a memory buffer 94, such as a FIFO memory buffer, for each corresponding PE 16. For example, the data from each of the PEs 16 are drained into a corresponding memory buffer 94, such as a FIFO memory buffer of the corresponding drain circuit 92. The drain microarchitecture 90 also includes a drain controller 96 operatively coupled to the drain circuits 92 via an adapter circuit 98. In the illustrated embodiment, all of the four drain circuits 92 are coupled to the same drain controller 96, thus enabling centralized drain control and reducing the number of control logic. In other embodiments, fewer than all drain circuits 92 may be coupled to a drain controller, and the rest of the drain circuits 92 may be coupled to different drain controller(s). The drain controller 96 may include a write controller 100 and a memory buffer monitor 102. The write controller 100 may enable writing the computation results (e.g., partial computation results) from each of the drain circuit 92 to a suitable location (e.g., a system host). For example, the adapter 98 may include data bus width converters coupled between the respective PEs 16 and the off-chip memory 34, and the write controller 100 may be operatively coupled to the data bus width converters to control streaming of the data output from the PEs 16 to the off-chip memory 34. In particular, the PEs 16 may stream data at a relatively larger width as compared to the relatively narrower data bus interface of the off-chip memory 34. In this case, the write controller 100 may control operation of the adapter 98 to narrow/funnel the output data streaming from the PEs 16 into the off-chip memory 34. In one embodiment, the output data from the PEs 16 may be streamed in multiple data pockets of the same size. The memory buffer monitor 102 may monitor a FIFO level of each of the memory buffer 94. In particular, the writer controller 100 may receive information indicative of backpressure from the memory buffers 94 and communicate this information to the memory buffer monitor 102, as indicated by the data communication arrow 74. Upon the determination by the memory buffer monitor 102 that the memory buffers 94 are full, the drain controller 96 may send signals to feeders (e.g., the feeder arrays 22 and 26), as indicated by a data communication arrow 104, to stop feeding the matrix data to the PEs 16.

On the other hand, in the absence of the data communication (e.g., indicated by arrows 74 and 104) indicative of a critical backpressure (e.g., the memory buffers 94 are full), the computation results (e.g., partial computation results) from the PE array 14 may be received and written to the suitable location (e.g., a system host), following data paths as indicated by arrows 106. The computation results from the systolic array 10 may be received in a statically scheduled fashion since results are generated by the PEs 16 in fixed cycle latency. In particular, as the feeder architecture 50 includes double-buffered sections (e.g., the first and second sections 56 and 58) and the data flow is pre-arranged and/or pre-determined to enable high data reuse (e.g., interleaving data), the computation results may be generated by the systolic array 10 as a constant stream. Accordingly, based on the feeder microarchitecture 50 and the drain microarchitecture 90 set forth above, stalling may be directly driven by write bandwidth (e.g., write wait request, as indicated by the data communication arrow 74) that depends at least in part on the FIFO memory buffer level of the memory buffers 94. As such, in at least some cases, efficiency of the drain circuits 92 may be directly proportional to the write bandwidth.

Next, the feeder data streaming of the matrix $A_{m,n}$ and matrix $B_{k,l}$ into the PE array 14 (e.g., dataflow from the feeder arrays 22 and 26 to the PE array 14) and the corresponding pre-arrangements of the matrix structures stored on the off-chip memory 34 are discussed. In the illustration shown in FIGS. 4-7, the matrix data are pre-arranged to be fed into an 8×8 PE array along each orthogonal edge via eight feeders, but it should be understood that the described process may be used for much larger PE arrays (e.g., 10×10 PE array, 12×12 PE array, 16×16 PE array, 24×24 PE array, 50×50 PE array, 100×100 PE array, 200×200 PE array, 1000×1000 PE array, or more). As should be appreciated, the feeder data streaming with feeding patterns that enable high data reuse without complex data sequencing and large memory buffer for reordering may be achievable because the matrix data (e.g., matrix $A_{m,n}$ and matrix $B_{k,l}$) are stored in the off-chip memory 34 in a pre-arranged manner that supports such feeding patterns of the feeder data streaming. The feeder data streaming into the PE array 14 via the feeder arrays 22 and 26 and the pre-arranged matrix structures stored in the off-chip memory 34 may be tightly interrelated, and thus swapping the pre-arranged matrix structures of matrix $A_{m,n}$ and matrix $B_{k,l}$ would not support feeder data streaming with the feeding patterns discussed herein.

Figure 4:
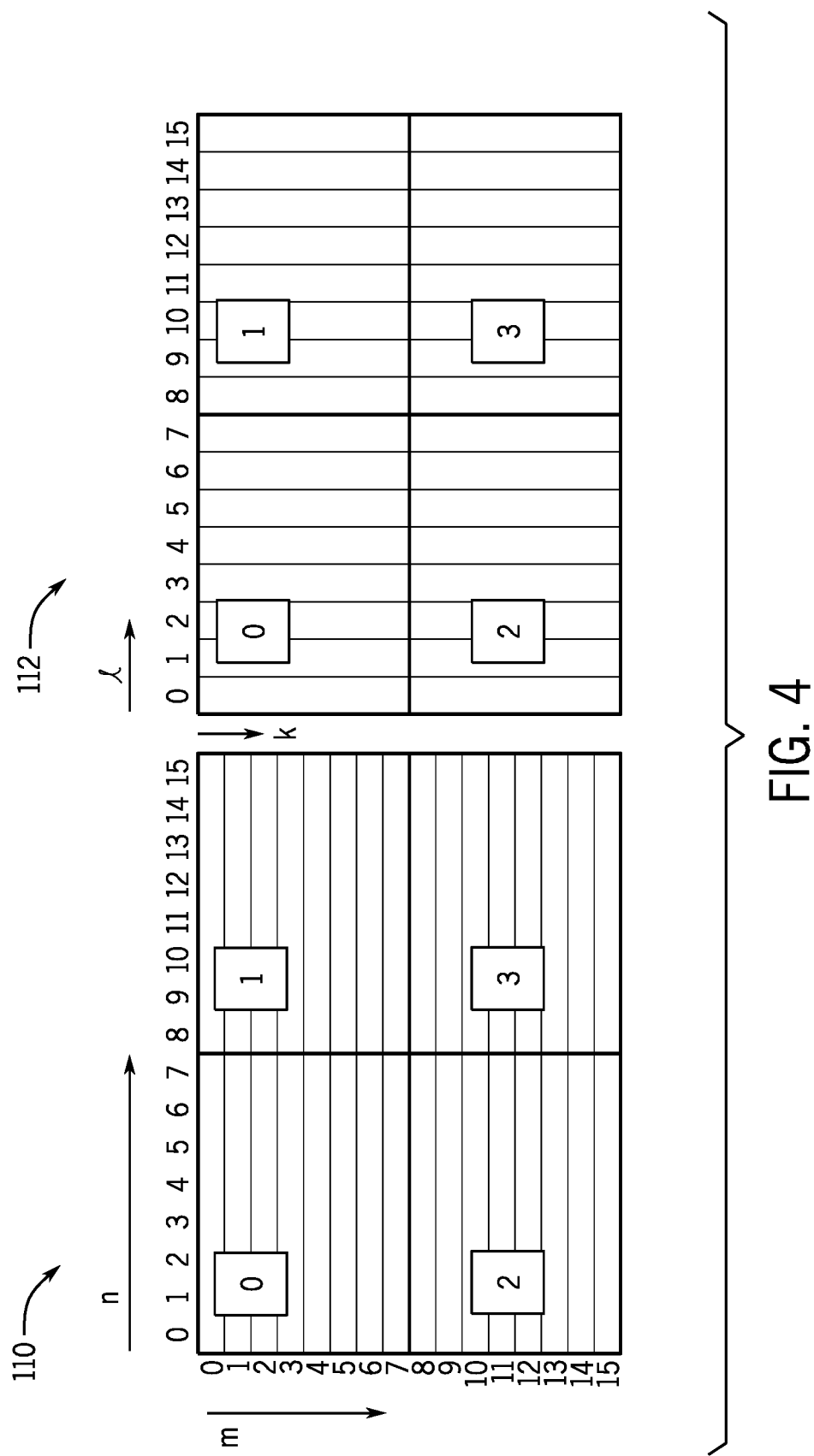
FIG. 4 is a schematic representation of matrix structures in a matrix multiplication carried out by the systolic array of FIG. 1A, in accordance with an embodiment.

FIG. 4 is a schematic representation illustrating an original matrix structure 110 of matrix $A_{m,n}$ and an original matrix structure 112 of matrix $B_{k,l}$, stored on the off-chip memory 34. The original matrix structures 110 and 112 are both stored in row-major order (e.g., the consecutive elements of a row reside next to each other; row elements of the array are contiguous in memory). Each of the original matrix structures 110 and 112 may be divided or partitioned into a suitable number of sections. In the illustrated embodiments, the original matrix structure 110 is a 16×16 matrix (e.g., m=n=16) and the original matrix 112 is also a 16×16 matrix (e.g., k=l=16). Each of the original matrix structures 110 and 112 is partitioned into four sections, sections 0, 1, 2, and 3, as shown. The section 0 includes matrix data from rows 0-7 and columns 0-7, the section 1 includes rows 0-7 and columns 8-15, the section 2 includes rows 8-15 and columns 0-7, and the section 3 includes rows 8-15 and columns 8-15.

Figure 5:
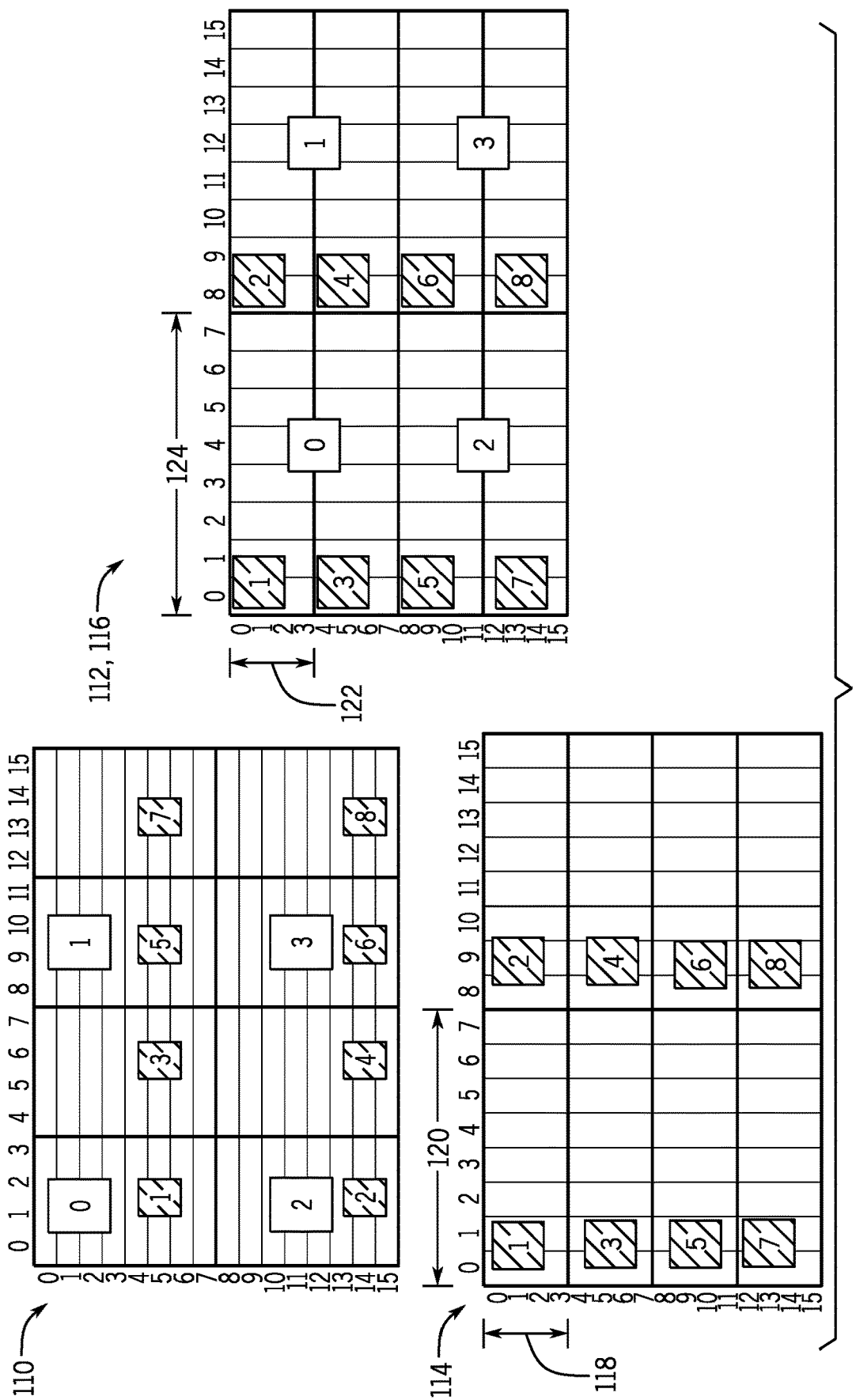
FIG. 5 is a schematic representation of pre-arrangements of the matrix structures of FIG. 4, in accordance with an embodiment.

FIG. 5 is a schematic representation illustrating a pre-arranged matrix structure 114 of the original matrix structure 110 of matrix $A_{m,n}$ and a pre-arranged matrix structure 116 of the original matrix structure 112 of matrix $B_{k,l}$, stored on the off-chip memory 34. Each of the original matrix structures 110 and 112 may be further divided or partitioned into a suitable number of sub-sections. In the illustrated embodiments, each of the original matrix structures 110 and 112 is partitioned into eight sub-sections, sub-section 1, sub-section 2 . . . , and sub-subsection 8, as shown. In particular, for matrix $A_{m,n}$, the section 0 is further partitioned into sub-sections 1 and 3, the section 1 is further partitioned into sub-sections 5 and 7, the section 2 is further partitioned into sub-sections 2 and 4, and the section 3 is further partitioned into sub-sections 6 and 8, as shown. The sub-sections 1-8 are then re-arranged into the pre-arranged matrix structure 114.

For the matrix $A_{m,n}$, the orientation of the matrix changes as the original matrix structure 110 is re-arranged into the pre-arranged matrix structure 114. In particular, rows 0-7 and columns 0-3 in the original matrix structure 110 become rows 0-3 and columns 0-7 in the pre-arranged matrix structure 114, rows 8-15 and columns 0-3 in the original matrix structure 110 become rows 0-3 and columns 8-15 in the pre-arranged matrix structure 114, rows 0-7 and columns 4-7 in the original matrix structure 110 become rows 4-7 and columns 0-7 in the pre-arranged matrix structure 114, and so forth (e.g., the orientation has changed).

On the other hand, for matrix $B_{k,l}$, the difference between the pre-arranged matrix structure 116 and the original matrix structure 112 is in the number of partitions. In particular, the four sections 0-3 are further partitioned into sub-sections 1-8, without changes in the orientation.

Each of the sub-sections of the pre-arranged matrix structure 114 has a size of a height 118×a width 120, and each of the sub-sections of the pre-arranged matrix structure 116 has size of a height 122×width 124. In the illustrated embodiment, the pre-arranged matrix structures 114 and 116 both have a size of four rows×eight columns (e.g., heights 118=height 122=4 widths 120=width 124=8).

Figure 6:
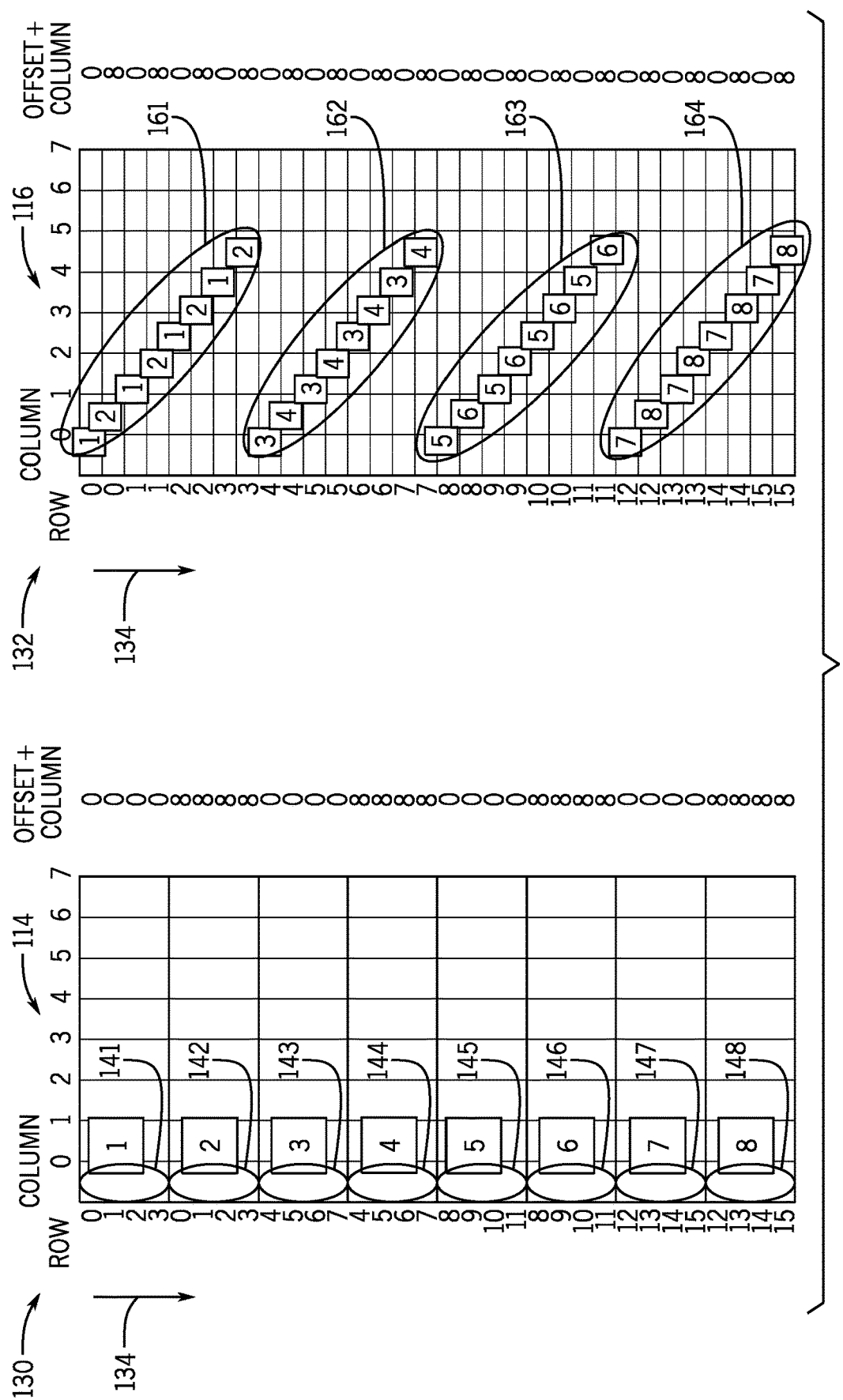
FIG. 6 is a schematic representation illustrating feeding patterns to feed matrix data from the pre-arranged matrix structures of FIG. 5 into the systolic array of FIG. 1A, in accordance with an embodiment.

FIG. 6 is a schematic representation illustrating a feeding pattern 130 to feed the matrix $A_{m,n}$ data from the pre-arranged matrix structure 114 and a feeding pattern 132 to feed the matrix $B_{k,l}$ from the pre-arrange matrix structure 116, from the off-chip memory 34 to the feeder arrays 22 and 26, respectively. The feeding patterns 130 and 132 are arranged in terms of the order that the matrix data are fed with respect to a time coordinate 134.

For the feeding pattern 130, the matrix data $A_{m,n}$ in the pre-arranged matrix structure 114 fed from the off-chip memory 34 into the first feeder $Y_1$ is illustrated as an example. In particular, a portion of the data from the sub-section 1 (e.g., a first column of eight columns of data in the sub-section 1) is fed, followed by a portion (e.g., a first column) of the data from the sub-section 2, followed by a portion (e.g., a first column) of the data from the sub-section 3, and so forth along the time coordinate 134. Accordingly, the first feeder $Y_1$ may receive a segment 141 from the sub-section 1, followed by a segment 142 from the sub-section 2 . . . , followed by a segment 143 from the sub-section 3 . . . , followed by a segment 148 from the sub-section 8. The segments 141-148 are indicated as column 1 as shown. In the same manner, the second feeder $Y_2$ may receive segments from column 2, the third feeder $Y_3$ may receive segments from column 3, and so forth.

It should be noted that according to the feeding pattern 130, the segment 141 of the sub-section 1 corresponds to $A_{0,0}, A_{0,1}, A_{0,2}, A_{0,3}$ in the original matrix structure 110, the segment 142 of the sub-section 2 corresponds to $A_{8,0}, A_{8,1}, A_{8,2}, A_{8,3}$ in the original matrix structure 110, and so forth. As such, the first row of each of the sections 0-3 of the matrix $A_{m,n}$ in the original matrix structure 110 are received by the feeder array 22. In particular, the first row of each of the sections 0-3 of the matrix $A_{m,n}$ are received by the first feeder $Y_1$, the second row of each of the sections 0-3 of the matrix $A_{m,n}$ are received by the second feeder $Y_2$, the third row of each of the sections 0-3 of $A_{m,n}$ are received by the third feeder $Y_3$, and so forth.

For the feeding pattern 132, the matrix data $B_{k,l}$ in the pre-arranged matrix structure 116 fed from the off-chip memory 34 into the first feeder $X_1$ is illustrated as an example. In particular, portions of the data from the sub-sections 1 and 2 (e.g., a first column of eight columns of data in the sub-section 1 and a first column of eight columns of data in the sub-section 2) are fed, followed by portions (e.g., first columns) of the data from the sub-sections 3 and 4, followed by portions (e.g., first columns) of the data from the sub-sections 5 and 6, and followed by portions (e.g., first columns) of the data from sub-sections 7 and 8. Accordingly, the first feeder $X_1$ may receive a segment 161 from the sub-sections 1 and 2, followed by a segment 162 from the sub-sections 3 and 4, followed by a segment 163 from the sub-sections 5 and 6, followed by a segment 164 from the sub-sections 7 and 8, as shown. In the same manner, the second feeder $X_2$ may receive segments from column 2 of each of the sub-sections 1-8, the third feeder $X_3$ may receive segments from column 3 of each of the sub-sections 1-8, and so forth.

It should be noted that according to the feeding pattern 132, the segment 161 of the sub-sections 1-2 corresponds to $B_{0,0}$, $B_{0,8}$, $B_{1,0}$, $B_{1,8}$, $B_{2,0}$, $B_{2,8}$, $B_{3,0}$ and $B_{3,8}$ in the original matrix structure 112, the segment 162 of the sub-sections 3-4 corresponds to $B_{4,0}$, $B_{4,8}$, $B_{5,0}$, $B_{5,8}$, $B_{6,0}$, $B_{6,8}$, $B_{7,0}$ and $B_{7,8}$ in the original matrix structure 112, and so forth. As such, the first columns of the sub-sections 1-8 from the sections 0-3 of are received by the first feeder $X_2$, the second columns of the sub-sections 1-8 from the sections 0-3 are received by the second feeder $X_2$, the third columns of the sub-sections 1-8 from the sections 0-3 of $B_{k,l}$ are received by the third feeder $X_3$, and so forth.

Figure 7:
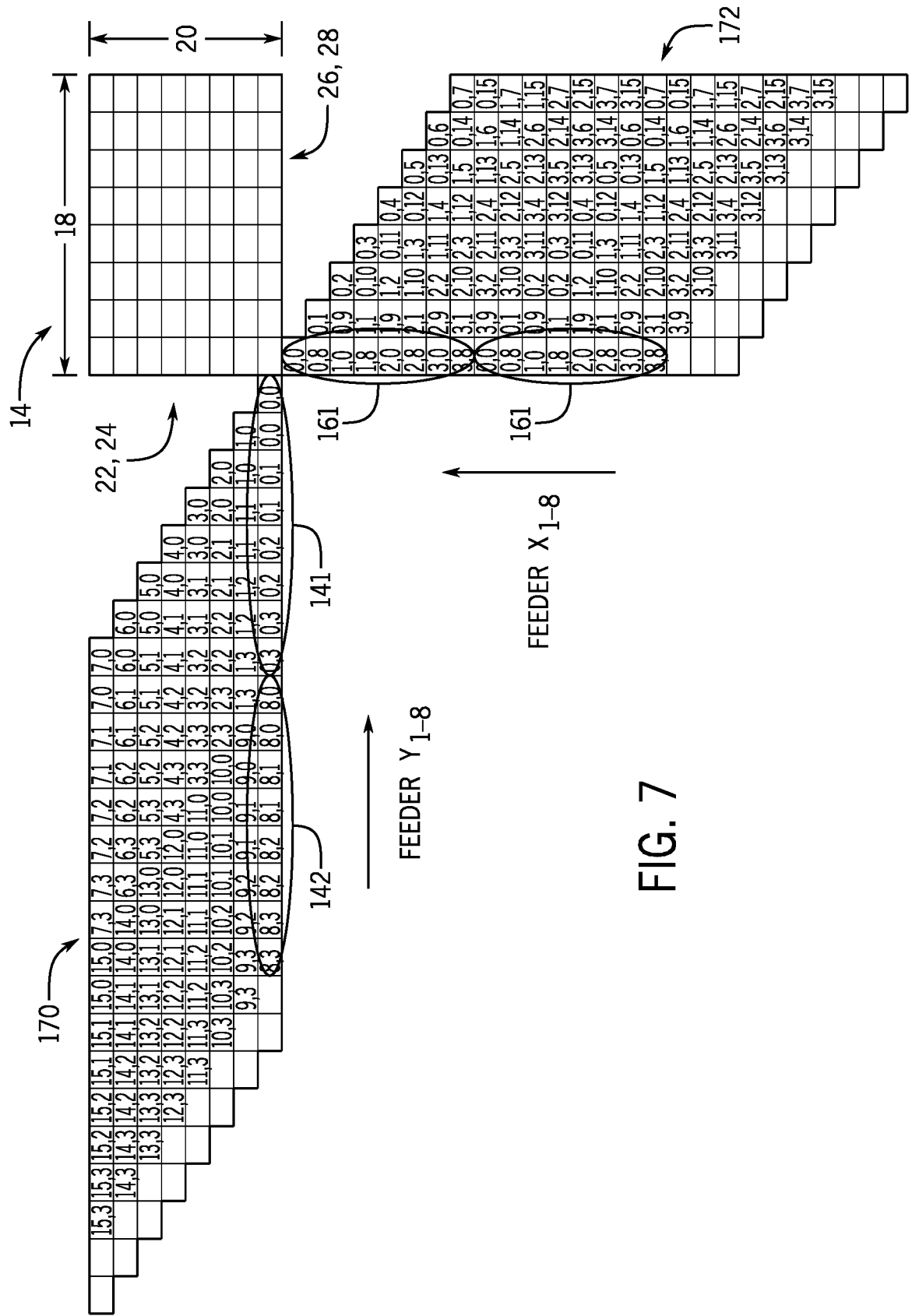
FIG. 7 is a schematic representation illustrating feeder data streaming of the pre-arranged matrix structures of FIG. 5 into a processing element array of the systolic array of FIG. 1A, in accordance with an embodiment.

FIG. 7 is a schematic representation illustrating a feeder data streaming 170 of the matrix $A_{m,n}$ and a feeder data streaming 172 of the matrix $B_{k,l}$, from the feeder arrays 22 and 26 to the PE arrays 14, respectively. In particular, the feeder data streaming 170 and 172 are based on the order or sequence that the matrix data $A_{m,n}$ and $B_{k,l}$ are received by the feeder arrays 22 and 26 according to the feeding patterns 130 and 132. For the illustrated feeder data streamings 170 and 172, the PE array 14 is an 8×8 array (e.g., the height 20=the width 18=8) and is coupled to the feeder arrays 22 and 26, each includes eight feeders.

The matrix $A_{m,n}$ data in the pre-arranged matrix structure 114 are fed into the PE array 14 in a manner that the matrix data $A_{m,n}$ in the original matrix structure 110 are "twice-repeated and interleaved with respect to the matrix data in the sections 0-3." The feeder data streaming 170 is discussed using the first feeder $Y_1$ for example. The matrix data from each of the segments 141-148 of the sections 0-3 are fed twice (e.g., twice-repeated). For example, $A_{0,0}$, $A_{0,0}$, $A_{0,1}$, $A_{0,1}$, $A_{0,2}$, $A_{0,2}$, $A_{0,3}$, $A_{0,3}$ from the segment 141, $A_{8,0}$, $A_{8,0}$, $A_{8,1}$, $A_{8,1}$, $A_{8,2}$, $A_{8,2}$, $A_{8,3}$, $A_{8,3}$ from the segment 142, and the rest of the data from the segments 143-148 (not shown) are fed via the first feeder $Y_1$. The term "interleaved" may refer to data fed through the same feeder are shared over time. For example, the matrix data from each of the segments 141-148 of the sections 0-3 are interleaved (e.g., data fed through the first feeder $Y_1$ are shared over time).

Once the data streaming 170 for the first feeder $Y_1$ is completed, the data streaming 170 proceeds with the second feeder $Y_2$, subsequently the third feeder $Y_3$, and so forth till the eighth feeder Ys. Each of the feeders $Y_2$-$Y_8$ streams data from the directly adjacent column in the sub-sections 1-8 of the pre-arranged matrix structure 114. For example, the second feeder $Y_2$ streams $A_{1,0}$, $A_{1,1}$, $A_{1,2}$, $A_{1,3}$ and $A_{9,0}$, $A_{9,1}$, $A_{9,2}$, $A_{9,3}$, which are directly adjacent to $A_{0,0}$, $A_{0,1}$, $A_{0,2}$, $A_{0,3}$ and $A_{8,0}$, $A_{8,1}$, $A_{8,2}$, $A_{8,3}$ (in the pre-arranged matrix structure 114) streamed by the first feeder $Y_1$. For example, the third feeder $Y_3$ streams $A_{2,0}$, $A_{2,1}$, $A_{2,2}$, $A_{2,3}$ and $A_{10,0}$, $A_{10,1}$, $A_{10,2}$, $A_{10,3}$, which are directly adjacent to $A_{1,0}$, $A_{1,1}$, $A_{1,2}$, $A_{1,3}$ and $A_{9,0}$, $A_{9,1}$, $A_{9,2}$, $A_{9,3}$ (in the pre-arranged matrix structure 114), streamed by the second feeder $Y_2$.

The matrix $B_{k,l}$ data are fed into the PE array 14 in a manner that the matrix data $B_{k,l}$ are "interleaved in the sections 0-3 and repeated twice." The matrix data from each of the segments 161-164 of the sections 0-3 are fed twice (e.g., repeated twice). For example, $B_{0,0}$, $B_{0,8}$, $B_{1,0}$, $B_{1,8}$, $B_{2,0}$, $B_{2,8}$, $B_{3,0}$, $B_{3,8}$ from the segment 161 are fed twice in this exact order, and the rest of the data from the segments 162-164 (not shown) are fed twice in their respective orders via the first feeder $X_1$. The term "interleaved" may refer to data fed through the same feeder are shared over time. For example, the matrix data from each of the segments 161-164 of the sections 0-3 are interleaved (e.g., data fed through the first feeder $X_1$ are shared over time).

Once the data streaming 172 for the first feeder $X_1$ is completed, the data streaming 172 proceeds with the second feeder $X_2$, subsequently the third feeder $X_3$, and so forth till the eighth feeder Xs. Each of the feeders $X_2$-$X_8$ streams data from the directly adjacent column in the sub-sections 1-8 of the pre-arranged matrix structure 116. For example, the second feeder $X_2$ streams $B_{0,1}$, $B_{0,9}$, $B_{1,1}$, $B_{1,9}$, $B_{2,1}$, $B_{2,9}$, $B_{3,1}$, $B_{3,9}$ that are directly adjacent to $B_{0,0}$, $B_{0,8}$, $B_{1,0}$, $B_{1,8}$, $B_{2,0}$, $B_{2,8}$, $B_{3,0}$, $B_{3,8}$ (in the pre-arranged matrix structure 116) streamed by the first feeder $X_1$. For example, the third feeder $X_3$ streams $B_{0,2}$, $B_{0,1}$, $B_{1,2}$, $B_{1,10}$, $B_{2,0}$, $B_{2,10}$, $B_{3,2}$, $B_{3,10}$ that are directly adjacent to $B_{0,1}$, $B_{0,9}$, $B_{1,1}$, $B_{1,9}$, $B_{2,1}$, $B_{2,9}$, $B_{3,1}$, $B_{3,9}$ (in the pre-arranged matrix structure 116) streamed by the first feeder $X_1$.

With the foregoing in mind, the sizes of the matrices $A_{m,n}$ and $B_{k,l}$ and the size of PE array 14 are dependent of one another. The matrices $A_{m,n}$ and $B_{k,l}$ may be different in size (e.g., m×n≠l×k). The sizes of the matrices $A_{m,n}$ and $B_{k,l}$ and may be multiples of the size of the systolic array 10 or may be zero-padded accordingly. In other words, m may be a number or zero-padded to a number that is any suitable positive integer times the height 20 of the PE array 14 (or the height 30 of the feeder array 22), and l may be a number or zero-padded to a number that is any suitable positive integer times the width 18 of the PE array 14 (or the width 32 of the feeder array 26). In addition, n must be equal to k for the outer product operation of $A_{mn}$×$B_{kl}$ to operates properly, and n and k divided by 2 may be any suitable positive integer. For example, the matrix $A_{m,n}$ may be 704×256 in size, fed into the PE array 14 that is 22×17 in size via the feeder array 22 that is 22 in size. The matrix $B_{k,l}$ may be 256×544 in size, fed into the PE array 14 that is 22×17 in size via the feeder array 26 that is 17 in size. In this case, m is 32 times the height 20 of the PE array 14 (or the height 30 of the feeder array 22) and n divided by 2 is 128; l is 32 times the width 18 of the PE array 14 (or the width 32 of the feeder array 26) and k divided by 2 is 128. It should also be noted that each of the sub-sections 1-8 in FIG. 5 is a 4×8 array because in the illustrated example, each PE 16 is a 4-input multiply-accumulate (MAC) mode PE (e.g., the PE performs four consecutive multiply-and-accumulate operation) and there are eight feeders in each of the feeder arrays 22 and 26. It may be generalized that the size of each sub-sections of the matrix $A_{m,n}$=MAC input mode×number of feeders (e.g., feeders 24) and the size of each sub-sections of the matrix $B_{k,l}$=MAC input mode×number of feeders (e.g., feeders 26). The MAC input mode is constant for the matrices $A_{m,n}$ and $B_{k,l}$ because the matrix $A_{m,n}$ row and matrix $B_{k,l}$ must be of the same length (m 1).

Figure 8:
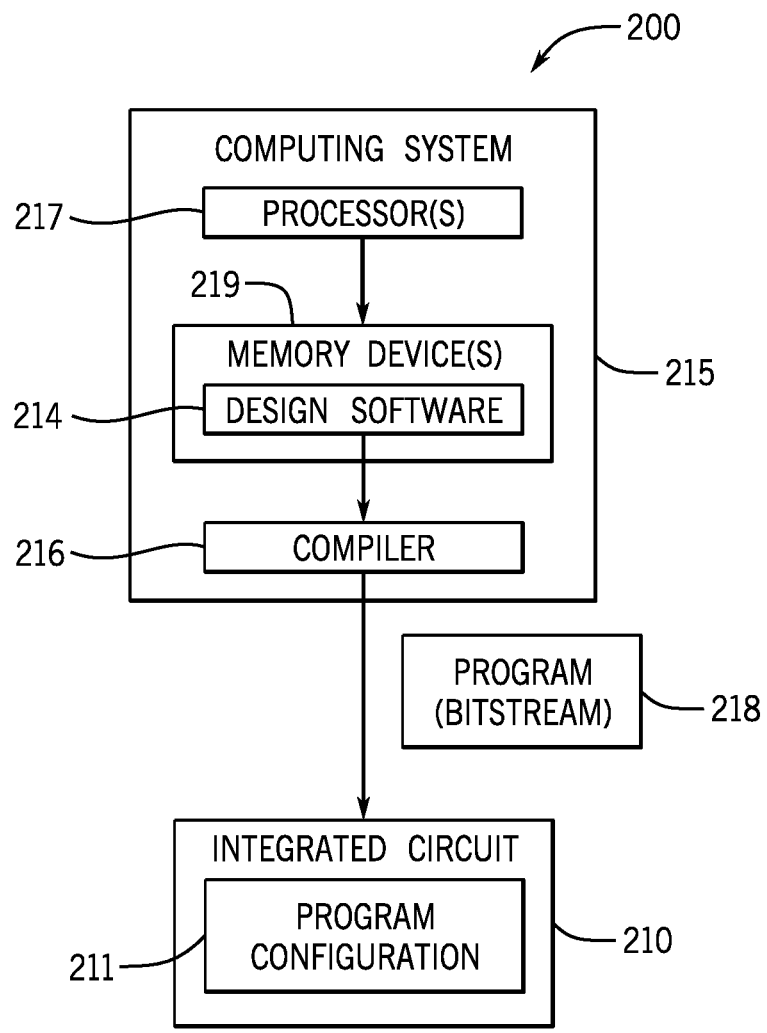
FIG. 8 is a block diagram illustrating an integrated circuit system that may be used to carry out an implementation of the systolic array of FIG. 1A, in accordance with an embodiment.

FIG. 8 illustrates a block diagram of a system 200 that may be used to program a systolic array onto an integrated circuit 210. The integrated circuit 210 may be reconfigurable (e.g., a field programmable gate array (FPGA)) or may be an application-specific integrated circuit (ASIC). A user may implement a circuit design to be programmed onto the integrated circuit 210 using design software 214, such as a version of Quartus by Intel®.

The design software 214 may be executed by one or more processors 217 of a computing system 215. The computing system 215 may include any suitable device capable of executing the design software 214, such as a desktop computer, a laptop, a mobile electronic device, a server, or the like. The computing system 215 may access, configure, and/or communicate with the integrated circuit 210. The processor(s) 217 may include multiple microprocessors, one or more other integrated circuits (e.g., application specific integrated circuits, field programmable gate arrays, reduced instruction set processors, and the like), or some combination of these.

One or more memory devices 219 may store the design software 214. In addition, the memory device(s) 219 may store information related to the integrated circuit 210, such as control software, configuration software, look up tables, configuration data, etc. In some embodiments, the processor(s) 217 and/or the memory device(s) 219 may be external to the computing system 215. The memory device(s) 219 may include a tangible, non-transitory, machine-readable-medium, such as a volatile memory (e.g., a random access memory (RAM)) and/or a nonvolatile memory (e.g., a read-only memory (ROM)). The memory device(s) 219 may store a variety of information and be used for various purposes. For example, the memory device(s) 219 may store machine-readable and/or processor-executable instructions (e.g., firmware or software) for the processor(s) 217 to execute, such as instructions to determine a speed of the integrated circuit 210 or a region of the integrated circuit 210, determine a criticality of a path of a design programmed in the integrated circuit 210 or a region of the integrated circuit 210, programming the design in the integrated circuit 210 or a region of the integrated circuit 210, and the like. The memory device(s) 219 may include one or more storage devices (e.g., nonvolatile storage devices) that may include read-only memory (ROM), flash memory, a hard drive, or any other suitable optical, magnetic, or solid-state storage medium, or any combination thereof.

The design software 214 may use a compiler 216 to generate a low-level circuit-design program 218 (bitstream), sometimes known as a program object file, which programs the integrated circuit 210. That is, the compiler 216 may provide machine-readable instructions representative of the circuit design to the integrated circuit 210. For example, the integrated circuit 210 may receive one or more programs 218 (bitstreams) that describe the hardware implementations that should be stored in the integrated circuit 210. The programs 218 (bitstreams) may programmed into the integrated circuit 210 as a configuration program 211.

Figure 9:
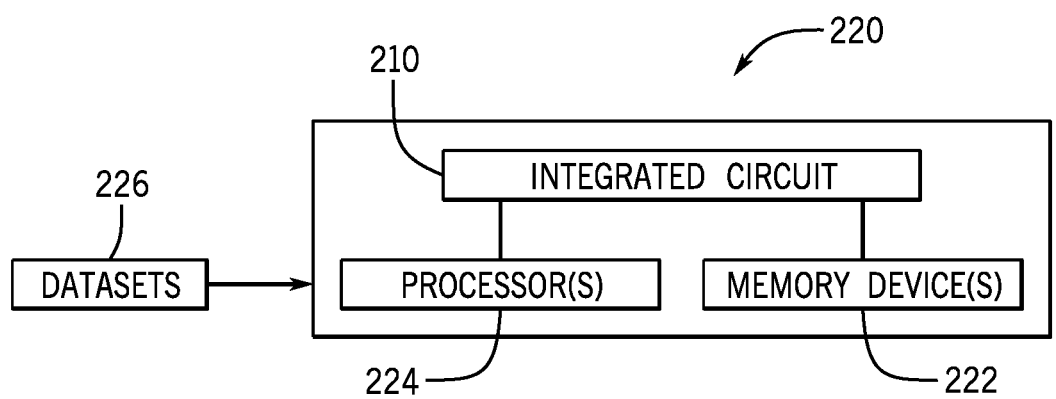
FIG. 9 is an example of an electronic system for processing datasets using the systems and methods of this disclosure, in accordance with an embodiment.

As shown in FIG. 9, the integrated circuit 210 may operate in a data processing system 200 to assist in processing datasets 226 (e.g., matrix data) using the systolic array systems and methods of this disclosure. The data processing system 220 may represent, for example, a computing device in a datacenter, which may process network traffic, image data, video data, financial data, or any other suitable form of data. In some examples, the datasets 226 may be processed using a machine-learning or neural-network algorithm that may employ the systolic array of this disclosure. A processor complex 224 may execute instructions (e.g., software or firmware) stored in memory and/or storage 222 to receive and route the datasets 226 and to control the integrated circuit 210. For instance, the processor complex 224 may run software to analyze process network traffic, image data, video data, financial data, or any other suitable form of data, offloading to the integrated circuit 210 operations that are well-suited to processing by a systolic array on the integrated circuit 210. The memory and/or storage 222 may store the one or more programs 218 (bitstreams) that may be used to program a programmable fabric of the integrated circuit 210 (e.g., when the integrated circuit 210 is a programmable logic device, such as a field-programmable gate array (FPGA)).

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A systolic array implemented in circuitry of an integrated circuit, comprising:
a processing element array, comprising processing elements;
one or more feeder circuits communicatively coupled to the processing element array, wherein the one or more feeder circuits comprise a double buffer comprising:
a first buffer section configured to receive data stored in memory external to the integrated circuit; and
a second buffer section configured to transfer the received data to the processing element array, wherein the data transferring from the memory to the processing element array is double buffered, via the first buffer section and the second buffer section, to facilitate transferring the received data to the processing element array according to a feeding pattern, wherein the feeding pattern comprises repetition of a first data cell of a sub-section of a matrix structure prior to a second data cell of the sub-section; and
one or more drain circuits communicatively coupled to the processing element array, comprising one or more memory buffers configured to store data output by the processing element array.

2. The systolic array of claim 1, comprising a first controller communicatively coupled to the one or more feeder circuits, wherein the first controller comprises:
a read controller configured to enable reading the data stored in the memory external to the integrated circuit;
a valid check logic configured to perform valid check on the first buffer section, the second buffer section, or both; and
a backpressure check logic configured to provide indication relating to backpressure from the one or more drain circuits to the read controller.

3. The systolic array of claim 2, wherein the backpressure check logic provides the indication in response to one or more memories of the one or more drain circuits being full.

4. The systolic array of claim 1, comprising a second controller communicatively coupled to the one or more drain circuits, wherein the second controller comprises:
a write controller configured to enable writing the data output by the processing element array; and a buffer monitor configured to monitor a first-in-first-out (FIFO) level of each of the one or more memory buffers.

5. The systolic array of claim 4, wherein the second controller sends signals to stop feeding the data stored in the memory in response to the one or more memory buffers being full.

6. The systolic array of claim 1, wherein the matrix structure comprises a first pre-arranged matrix structure, and wherein the data stored in the memory comprises:
matrix $A_{m,n}$ re-arranged in the first pre-arranged matrix structure, wherein orientation of the matrix $A_{m,n}$ in the first pre-arranged matrix structure is different from orientation of the matrix $A_{m,n}$ in its original arrangement; and
matrix $B_{k,l}$ re-arranged in a second pre-arranged matrix structure.

7. The systolic array of claim 6, wherein the feeding pattern comprises a first feeding pattern, wherein the first pre-arranged matrix structure comprises a first plurality of sub-sections arranged to facilitate the first feeding pattern of the matrix $A_{m,n}$ into the processing element array, wherein the first plurality of sub-sections comprises the sub-section, and wherein the second pre-arranged matrix structure comprises a second plurality of sub-sections arranged to facilitate a second feeding pattern of the matrix $B_{k,l}$ into the processing element array.

8. The systolic array of claim 7, wherein the first pre-arranged matrix structure and the second pre-arranged matrix structure are pre-determined based on dimension and size of the processing element array.

9. The systolic array of claim 1, wherein the integrated circuit is a field-programmable gate array.

10. An integrated circuit device, comprising:
an integrated circuit comprising a systolic array, comprising:
a processing element array, comprising processing elements arranged in a vertical direction and a horizontal direction;
a drain array communicatively coupled to the processing element array;
a first feeder array, comprising first feeders communicatively coupled to the processing elements in the vertical direction to load first matrix data from an external memory to the processing element array according to a first feeding pattern, wherein the first matrix data comprises matrix $A_{m,n}$ in a first pre-arranged matrix structure such that orientation of the matrix $A_{m,n}$ in the first pre-arranged matrix structure is different from an original orientation of the matrix $A_{m,n}$, wherein the first pre-arranged matrix structure comprises a first plurality of sub-sections, wherein the first feeding pattern comprises a first ordering of the first plurality of sub-sections to be loaded to the processing element array, wherein the first ordering facilitates repetition of a first data cell of a sub-section of the first pre-arranged matrix structure, into a feeder of the first feeders, prior to loading a second data cell of the sub-section into the feeder; and
a second feeder array, comprising second feeders communicatively coupled to the processing elements in the horizontal direction to load second matrix data from the external memory to the processing element array according to a second feeding pattern, wherein the second matrix data comprises matrix $B_{k,l}$ in a second pre-arranged matrix structure, wherein the second pre-arranged matrix structure comprises a second plurality of sub-sections, wherein the first feeding pattern comprises a second ordering of the second plurality of sub-sections to be loaded to the processing element array, and wherein the first feeding pattern and the second feeding pattern are based on the first pre-arranged matrix structure and the second pre-arranged matrix structure, respectively, to enable data reuse and reduce bandwidth usage of the external memory.

11. The integrated circuit device of claim 10, comprising:
one or more memory devices coupled to the integrated circuit; and
one or more processors coupled to the one or memory devices and configured to execute instructions stored in the one or more memory devices to control operation of the integrated circuit.

12. The integrated circuit device of claim 10, wherein each of the first feeder array and the second feeder array comprises:
one or more feeder circuits communicatively coupled to the processing element array, wherein each of the one or more feeder circuits comprises a double buffer comprising:
a first buffer section configured to receive first data from the external memory during a first time period and send the received first data to the processing element array during a second time period; and
a second buffer section configured to send second data to the processing element array during the first time period and receive third data from the external memory during the second time period.

13. The integrated circuit device of claim 12, comprising a feeder controller communicatively coupled to the first feeder array, the second feeder array, or both, wherein the feeder controller comprises:
a read controller configured to enable reading the first matrix data, the second matrix data, or both;
a valid check logic configured to perform valid check on the first buffer section, the second buffer section, or both; and
a backpressure check logic configured to provide indication relating to backpressure from the drain array to the read controller.

14. The integrated circuit device of claim 10, wherein the drain array comprises:
one or more drain circuits communicatively coupled to the processing element array, comprising one or more memory buffers configured to store data output by the processing element array; and
a drain controller communicatively coupled to the one or more drain circuits.

15. The integrated circuit device of claim 14, wherein the drain controller comprises:
a write controller configured to enable writing the data output by the processing element array; and
a buffer monitor configured to monitor a first-in-first-out (FIFO) level of each of the one or more memory buffers.

16. The integrated circuit device of claim 14, wherein the drain controller sends signals to stop loading the first matrix data, the second matrix data, or both, from the external memory to the processing element array in response to the one or more memory buffers are full.

17. A method to load data to a systolic array implemented in an integrated circuit, comprising:
storing, in memory external to the integrated circuit, a first matrix in a first pre-arranged matrix structure, wherein the first pre-arranged matrix structure has a first matrix orientation that is different from a first original matrix orientation of the first matrix, wherein the first pre-arranged matrix structure comprises a first plurality of sub-sections;

storing, in the memory external to the integrated circuit, a second matrix in a second pre-arranged matrix structure, wherein the second pre-arranged matrix structure has a second matrix orientation that is the same as a second original matrix orientation of the second matrix, wherein the second pre-arranged matrix structure comprises a second plurality of sub-sections;

loading data of the first matrix to a processing element array of the systolic array according to a first feeding pattern based on the first pre-arranged matrix structure, wherein the first feeding pattern comprises an ordering of the first plurality of sub-sections, wherein the ordering comprises repeating a first portion of a first sub-section of the first plurality of sub-sections prior to feeding a second portion of a second sub-section of the first plurality of sub-sections; and loading data of the second matrix to the processing element array of the systolic array according to a second feeding pattern based on the second pre-arranged matrix structure, wherein the second feeding pattern comprises an ordering of the second plurality of sub-sections.

18. The method of claim 17, wherein repetition of a first portion of a first sub-section of the first plurality of sub-sections comprises streaming first data of the first sub-section of the first plurality of sub-sections twice and interleaving the streamed first data with second data from the second sub-section of the first plurality of sub-sections of the first pre-arranged matrix structure.

19. The method of claim 17, wherein loading data according to the second feeding pattern comprises streaming the data twice and interleaving the streamed data from different sub-sections of the first plurality of sub-sections of the first pre-arranged matrix structure.

20. The method of claim 17, wherein loading the data of the first matrix comprises loading data of the first matrix via a double buffer of a feeder array communicatively coupled to the processing element array.

* * * * *